US012754868B2

(12) United States Patent
Wang et al.

(10) Patent No.: US 12,754,868 B2
(45) Date of Patent: Oct. 6, 2026

(54) MANAGEMENT BOARD, INTERFACE MODULE, INDUSTRIAL CONTROL SERVER, AND INDUSTRIAL CONTROL SYSTEM

(71) Applicant: SUZHOU METABRAIN INTELLIGENT TECHNOLOGY CO., LTD., Suzhou (CN)

(72) Inventors: An Wang, Suzhou (CN); Chao Dong, Suzhou (CN); Shengjin Liu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/469,835

(22) PCT Filed: Dec. 13, 2024

(86) PCT No.: PCT/CN2024/139394
§ 371 (c)(1),
(2) Date: Sep. 26, 2025

(87) PCT Pub. No.: WO2025/200605
PCT Pub. Date: Oct. 2, 2025

(65) Prior Publication Data

US 2026/0119441 A1 Apr. 30, 2026

(30) Foreign Application Priority Data

Mar. 26, 2024 (CN) ......................... 202410348302.1

(51) Int. Cl.
*G06F 1/20* (2006.01)
*G06F 13/40* (2006.01)
*G06F 13/42* (2006.01)

(52) U.S. Cl.
CPC .......... *G06F 13/4221* (2013.01); *G06F 1/206* (2013.01); *G06F 13/40* (2013.01)

(58) Field of Classification Search
None
See application file for complete search history.

(56) References Cited

U.S. PATENT DOCUMENTS 11,818,235 B1 * 11/2023 Teshler .................. H04L 67/12
2005/0080887 A1 4/2005 Lee et al.
(Continued)

FOREIGN PATENT DOCUMENTS

CN 203070274 U 7/2013
CN 105740193 A 7/2016
(Continued)

OTHER PUBLICATIONS

D. V. Bhatt, D. du Toit and G. P. Hancke, "Design of a controller for a universal input/output port," 2012 IEEE International Instrumentation and Measurement Technology Conference Proceedings, Graz, Austria, 2012, pp. 647-652 (Year: 2012).*
(Continued)

*Primary Examiner* — Dayton Lewis-Taylor
(74) *Attorney, Agent, or Firm* — Scully, Scott, Murphy & Presser, P.C.

(57) ABSTRACT

Provided are a management board, an interface module, an industrial control server, and an industrial control system. The management board includes: a first interface signal control unit and a second interface signal control unit. The second interface signal control unit is configured to acquire an operating state of the first interface signal control unit; and an interface unit provided with at least one interface, and a gating unit, wherein one gating end of the gating unit is connected to the first interface signal control unit and the interface unit to form a first interface path, and the other
(Continued)

gating end of the gating unit is connected to the second interface signal control unit and the interface unit to form a second interface path. The second interface signal control unit is configured to select the first interface path or the second interface path according to the operating state.

20 Claims, 10 Drawing Sheets

(56) References Cited

U.S. PATENT DOCUMENTS

| | | | | |
|---|---|---|---|---|
| 2011/0191514 | A1* | 8/2011 | Wu | G06F 1/20 713/300 |
| 2013/0160984 | A1 | 6/2013 | Cash et al. | |
| 2016/0041590 | A1 | 2/2016 | Yu | |
| 2016/0110307 | A1 | 4/2016 | Lin | |
| 2017/0185124 | A1 | 6/2017 | Messick et al. | |
| 2024/0419618 | A1* | 12/2024 | Hu | G06F 11/3031 |

FOREIGN PATENT DOCUMENTS

| | | | |
|---|---|---|---|
| CN | 115529830 | A | 12/2022 |
| CN | 115712332 | A | 2/2023 |
| CN | 117573609 | A | 2/2024 |
| CN | 117971566 | A | 5/2024 |
| WO | 2022226776 | A1 | 11/2022 |

OTHER PUBLICATIONS

The search report of counterpart PCT application No. PCT/CN2024/139394 was issued on Mar. 18, 2025.

The first office action of counterpart CN application No. 202410348302.1 was issued on May 8, 2024.

Notification to Grant Patent Right of counterpart CN application No. 202410348302.1 was issued on May 22, 2024.

The search report of counterpart EP application 24927671.8 issued on Jun. 19, 2026.

* cited by examiner

MANAGEMENT BOARD, INTERFACE MODULE, INDUSTRIAL CONTROL SERVER, AND INDUSTRIAL CONTROL SYSTEM

CROSS-REFERENCE TO RELATED APPLICATIONS

The present application is a National Stage Entry under 35 U.S.C. § 371 of PCT International Application No. PCT/CN2024/139394, filed on Dec. 13, 2024, which claims priority to Chinese Patent Application No. 202410348302.1 filed to the China National Intellectual Property Administration on Mar. 26, 2024 and titled "MANAGEMENT BOARD, INTERFACE MODULE, INDUSTRIAL CONTROL SERVER, AND INDUSTRIAL CONTROL SYSTEM", the entire contents of each of which are incorporated herein by reference for all purposes.

TECHNICAL FIELD

Embodiments of the present application relate to the technical field of computers, and specifically, to a management board, an interface module, an industrial control server, and an industrial control system.

BACKGROUND

With the continuous improvement of industrial automation, industrial control servers are being used more and more widely in the field of industrial control. However, the existing industrial control servers have problems of poor reliability, insufficient stability, weak scalability, etc., making it difficult to meet the requirements of the field of industrial control for high availability, high stability, and high scalability. Therefore, developing an efficient and reliable self-control server is particularly important.

In related art, most interfaces of a traditional industrial control server are managed by a control component on a mainboard. However, as a primary component for data interaction between the industrial control server and an external device, the interface is typically used at high frequencies and thus highly prone to damage. During maintenance, the industrial control server needs to stop operating, and the mainboard also needs to be subjected to inspection and maintenance, resulting in high operation and maintenance costs of the industrial control server. Furthermore, the type and number of most interfaces of the traditional industrial control server are fixed, leading to poor scalability.

SUMMARY

According to a first aspect of the present application, a management board is provided. The management board includes:

- a first interface signal control unit, wherein the first interface signal control unit is connected to a mainboard via a bus;
- a second interface signal control unit, wherein the second interface signal control unit is connected to the mainboard via the bus, and the second interface signal control unit is connected to the first interface signal control unit to acquire an operating state of the first interface signal control unit;
- an interface unit, wherein the interface unit is provided with at least one interface; and
- a gating unit, wherein one gating end of the gating unit is connected to the first interface signal control unit and the interface unit to form a first interface path, the other gating end of the gating unit is connected to the second interface signal control unit and the interface unit to form a second interface path, and a gating control end of the gating unit is connected to the second interface signal control unit.

The second interface signal control unit is configured to select the first interface path or the second interface path according to the operating state.

In some embodiments of the present application, the first interface path and the second interface path both include UART serial port paths.

The first interface signal control unit includes a master controller, the second interface signal control unit includes a microprocessor, the gating unit includes a first gating controller, and the interface unit includes a serial port transceiver and at least one first serial port connector.

The master controller is connected to the microprocessor via an SPI bus and/or an I2C bus.

A Universal Asynchronous Receiver/Transmitter (UART) pin of the master controller and a UART pin of the microprocessor are respectively connected to two gating ends of the first gating controller, a gating control end of the first gating controller is connected to a first universal input/output pin of the microprocessor, a common input/output end of the first gating controller is connected to one end of the serial port transceiver, and the other end of the serial port transceiver is connected to the at least one first serial port connector via a UART serial port bus.

In some embodiments of the present application, the microprocessor is configured to:

- in response to an operating state of the master controller being normal, select, via the first universal input/output pin, a path from the UART pin of the master controller to the common input/output end of the first gating controller to become effective; and
- in response to the operating state of the master controller being abnormal, select, via the first universal input/output pin, a path from the UART pin of the microprocessor to the common input/output end of the first gating controller to become effective.

In some embodiments of the present application, the first interface path and the second interface path both include Controller Area Network (CAN) paths.

The first interface signal control unit further includes a first Serial Peripheral Interface (SPI)-to-CAN controller and a second SPI-to-CAN controller, the gating unit further includes a second gating controller and a third gating controller, and the interface unit further includes a first CAN transceiver, a second CAN transceiver, and a CAN port connector.

One SPI pin of the master controller is connected to an SPI pin of the first SPI-to-CAN controller, and the other SPI pin of the master controller is connected to an SPI pin of the second SPI-to-CAN controller.

A CAN pin of the first SPI-to-CAN controller and a first CAN pin of the microprocessor are respectively connected to two gating ends of the second gating controller, a gating control end of the second gating controller is connected to a second universal input/output pin of the microprocessor, a common input/output end of the second gating controller is connected to one end of the first CAN transceiver, and the other end of the first CAN transceiver is connected to the CAN port connector.

A CAN pin of the second SPI-to-CAN controller and a second CAN pin of the microprocessor are respectively connected to two gating ends of the third gating controller, a gating control end of the third gating controller is connected to a third universal input/output pin of the microprocessor, a common input/output end of the third gating controller is connected to one end of the second CAN transceiver, and the other end of the second CAN transceiver is connected to the CAN port connector.

In some embodiments of the present application, the microprocessor is configured to:

in response to an operating state of the master controller being normal, select, via the second universal input/output pin, a path from the CAN pin of the first SPI-to-CAN controller to the common input/output end of the second gating controller become effective, and select, via the third universal input/output pin, a path from the CAN pin of the second SPI-to-CAN controller to the common input/output end of the third gating controller to become effective; and in response to the operating state of the master controller being abnormal, select, via the second universal input/output pin, a path from the first CAN pin of the microprocessor to the common input/output end of the second gating controller become effective, and select, via the third universal input/output pin, a path from the second CAN pin of the microprocessor to the common input/output end of the third gating controller to become effective.

In some embodiments of the present application, the master controller and the microprocessor are both connected to a gold finger, and the gold finger is detachably connected to a mainboard bus via a cable.

In some embodiments of the present application, the management board further includes an indication unit, wherein the indication unit includes a first indicator lamp and a second indicator lamp.

The first indicator lamp is connected to the master controller, and configured to indicate an in-place state of the master controller.

The second indicator lamp is connected to the microprocessor, and configured to indicate an in-place state of the microprocessor.

According to a second aspect of the present application, an interface module is provided. The interface module includes an expansion board and the management board above, wherein the expansion board is connected to any interface on the management board via an expansion board socket and expands any interface into a plurality of identical interfaces, and the management board and the expansion board are packaged in a management box.

In some embodiments of the present application, a plurality of expansion boards are provided.

According to a third aspect of the present application, an industrial control server is provided. The industrial control server includes:

a plurality of interface modules above, wherein the interface modules are all disposed at a front window of an industrial control server chassis, and each interface module includes at least one input/output interface that is configured to receive operating data from an industrial device;

a computing module, wherein the computing module is detachably connected to each interface module via a cable, and is configured to perform an operation on the operating data to generate a control instruction, and return the control instruction to the industrial device via a target input/output interface that receives the operating data; and a power supply module, wherein the power supply module is disposed at a rear window of the industrial control server chassis, is detachably connected to the interface module and the computing module, and is configured to supply power to the interface module and the computing module, respectively.

In some embodiments of the present application, the computing module includes: a mainboard and two central processing units.

The two central processing units are connected to the mainboard via a single-dual path or a dual-single path, wherein the two central processing units connected by adopting the single-dual path are interconnected via a high-speed bus to collaboratively execute a computing task; and the two central processing units connected by adopting the dual-single path are able to simultaneously execute the computing task, and when either of the central processing units fails, the other central processing unit takes over the computing task of the central processing unit that fails.

In some embodiments of the present application, the power supply module includes a first Power Supply Unit (PSU) and a second PSU. The power supply module is configured to:

control, in response to both the first PSU and the second PSU being normal, the first PSU and the second PSU to respectively bear half of a load;

control, in response to the first PSU being normal and the second PSU being abnormal, the first PSU to bear the entire load; and control, in response to the first PSU being abnormal and the second PSU being normal, the second PSU to bear the entire load.

In some embodiments of the present application, the industrial control server further includes an air-cooled heat dissipation module.

The air-cooled heat dissipation module is disposed between the interface module and the computing module; the air-cooled heat dissipation module is detachably connected to the computing module, and configured to deliver an air volume according to an operating state of the computing module; and the air-cooled heat dissipation module is turned on immediately after the computing module is powered on.

In some embodiments of the present application, the air-cooled heat dissipation module includes at least one fan module, each fan module includes two fans, and the two fans belonging to the same fan module are mutually redundant.

In some embodiments of the present application, the industrial control server further includes a cold-plate heat dissipation module.

The cold-plate heat dissipation module includes two cold plates and a liquid cooling pipeline, and the two cold plates are respectively attached to two central processing units and connected in series via the liquid cooling pipeline.

In some embodiments of the present application, the cold-plate heat dissipation module is configured to turn on in response to a temperature of any central processing unit exceeding a preset value.

In some embodiments of the present application, the industrial control server further includes a network module.

The network module is disposed at a rear window of an industrial control server chassis, and includes two dual-port network cards, wherein the two dual-port network cards are respectively connected to two central processing units, and two network ports of each dual-port network card are mutually redundant.

In some embodiments of the present application, the industrial control server further includes a storage module.

The storage module is disposed at a rear window of an industrial control server chassis, and includes a hard disk backplane and at least one hard disk, wherein each hard disk is connected to the hard disk backplane via a gold finger, and the hard disk backplane is connected to the mainboard via a cable.

In some embodiments of the present application, the interface module supports hot swapping.

In some embodiments of the present application, a snap-fit is provided on a side wall of a management box corresponding to each interface module, and a snap groove matching the snap-fit is provided in a side wall of the front window of the industrial control server chassis.

According to a fourth aspect of the present application, an industrial control system is provided. The industrial control system includes an industrial device and the industrial control server above, wherein the industrial device is connected to the industrial control server via a cable; and the industrial device receives a control instruction via the industrial control server.

BRIEF DESCRIPTION OF THE DRAWINGS

In order to illustrate technical solutions in the present application or in the related art more clearly, the drawings required in the description of embodiments or the related art will be introduced briefly below. Apparently, the drawings in the following description show some embodiments of the present application, and those of ordinary skill in the art may still derive other drawings from these drawings without creative efforts.

REFERENCE NUMERALS

- 100: Management board;
- 110: First interface signal control unit; 111: Master controller; 112: First SPI-to-CAN controller; 113: Second SPI-to-CAN controller;
- 120: Second interface signal control unit; 121: Microprocessor; CS1: First universal input/output pin; CS2: Second universal input/output pin; CS3: Third universal input/output pin;
- 130: Interface unit; 131: Serial port transceiver; 132: First serial port connector; 133: First CAN transceiver; 134: Second CAN transceiver; 135: CAN port connector;
- 140: Gating unit; 141: First gating controller; 142: Second gating controller; 143: Third gating controller;
- 150: Gold finger;
- 160: Indication unit; 161: First indicator lamp; 162: Second indicator lamp;
- 200: Expansion board; 210: Expansion board socket; 220: Second serial port connector;
- 300: Interface module; 310: Management box; 320: Snap-fit;
- 400: Computing module; 410: Mainboard; 420: Central processing unit;
- 500: Power supply module; 510: First PSU; 520: Second PSU;
- 600: Air-cooled heat dissipation module; 610: Fan module; 611: Fan;
- 700: Cold-plate heat dissipation module; 710: Cold plate; 720: Liquid cooling pipeline;
- 800: Network module;
- 900: Storage module;
- 1000: Industrial control server chassis; 1010: Front window; and 1020: Rear window.

DETAILED DESCRIPTION OF THE EMBODIMENTS

In order to make the objectives, the technical solutions, and the advantages of the present application clearer, the technical solutions in the present application will be described clearly and completely below with reference to the accompanying drawings in the present application. Apparently, the described embodiments are part of rather than all of the embodiments of the present application. All the other embodiments obtained by those of ordinary skill in the art based on the embodiments in the present application without creative effort fall within the scope of protection of the present application.

An industrial control server and an industrial control system of the present application are described below with reference to FIGS. 1 to 11.

Figure 1:
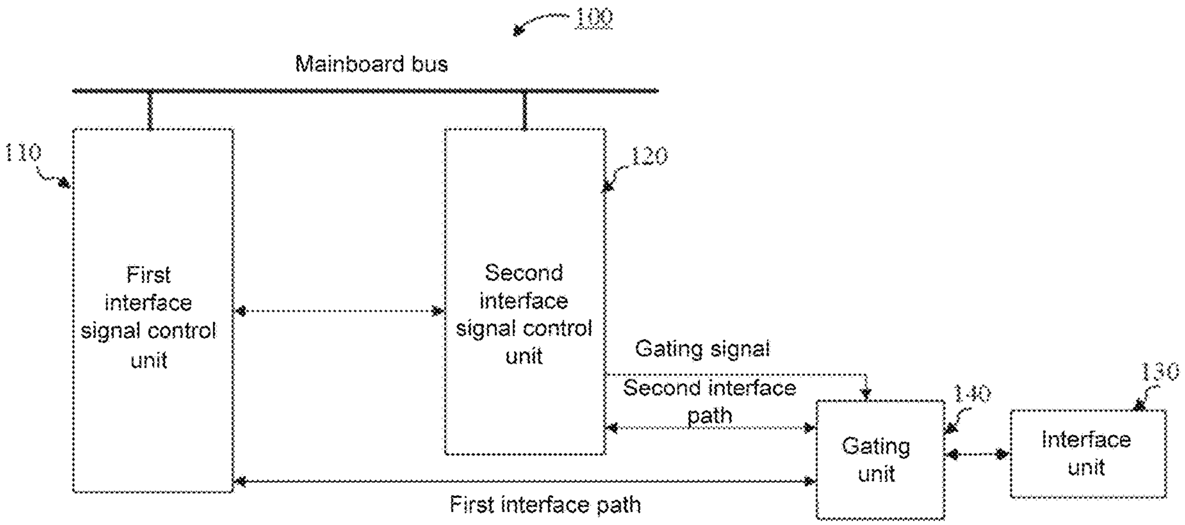
FIG. 1 is a first schematic structural diagram of a management board according to the present application.

FIG. 1 is a first schematic structural diagram of a management board according to the present application. Referring to FIG. 1, some embodiments of the present application provide a management board 100. The management board 100 mainly includes four portions, which are a first interface signal control unit 110, a second interface signal control unit 120, an interface unit 130, and a gating unit 140. The following will provide a detailed description in combination with each portion:

- a first interface signal control unit 110, wherein the first interface signal control unit 110 is connected to a mainboard via a bus;
- a second interface signal control unit 120, wherein the second interface signal control unit 120 is connected to the mainboard via the bus, and the second interface signal control unit 120 is connected to the first interface signal control unit 110 to acquire an operating state of the first interface signal control unit 110;
- an interface unit 130, wherein the interface unit 130 is provided with at least one interface; and
- a gating unit 140, wherein one gating end of the gating unit 140 is connected to the first interface signal control unit 110 and the interface unit 130 to form a first interface path, the other gating end of the gating unit 140 is connected to the second interface signal control unit 120 and the interface unit 130 to form a second interface path, and a gating control end of the gating unit 140 is connected to the second interface signal control unit 120.

The second interface signal control unit 120 is configured to select the first interface path or the second interface path according to the operating state.

The gating unit 140 is controlled, when the operating state of the first interface signal control unit 110 is normal, to select the first interface path, or the gating unit 140 is controlled, when the operating state of the first interface signal control unit 110 is abnormal, to select the second interface path.

In the management board of some embodiments of the present application, dual-interface signal control is realized by utilizing the first interface signal control unit 110 and the second interface signal control unit 120, which are both connected to the mainboard. Meanwhile, the second interface signal control unit 120 may monitor the operating state of the first interface signal control unit 110; the first interface path from the first interface signal control unit 110 to the interface unit 130 is constructed by means of the gating unit 140; the second interface path from the second interface signal control unit 120 to the interface unit 130 is constructed by means of the gating unit 140; and by utilizing the second interface signal control unit 120, the first interface path and the second interface path are selected according to the acquired operating state corresponding to the first interface signal control unit 110. Therefore, redundant interface management is achieved, the stability of an interface may be improved, and an interface management manner independent of the mainboard may further significantly reduce operation and maintenance costs.

Figure 2:
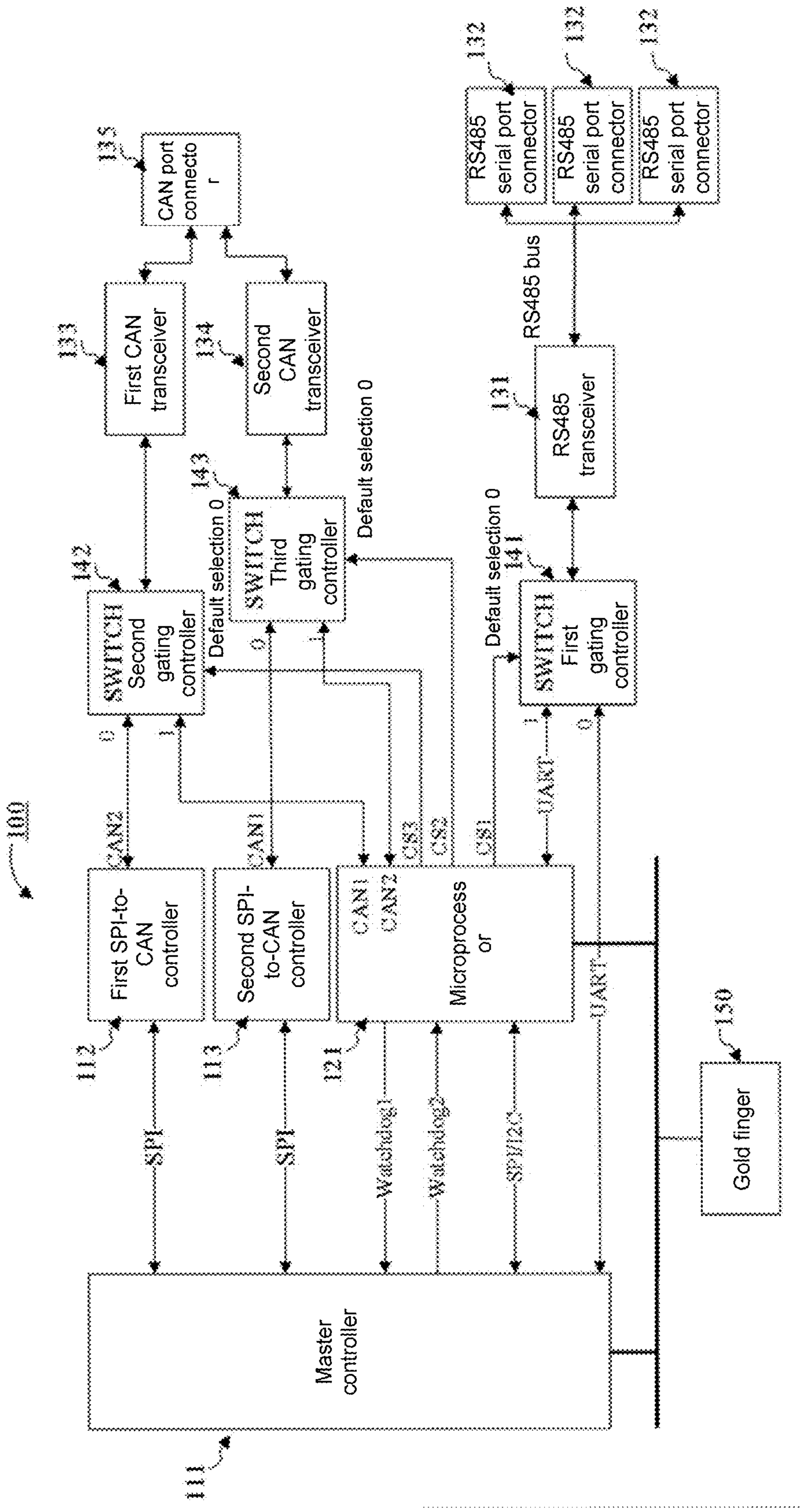
FIG. 2 is a second schematic structural diagram of a management board according to the present application.

In some embodiments of the present application, referring to FIG. 2, the first interface path and the second interface path both include UART serial port paths, wherein a UART serial port includes, but is not limited to, an RS485 serial port, an RS232 serial port, etc.

The first interface signal control unit 110 includes a master controller 111; the second interface signal control unit 120 includes a microprocessor 121; the gating unit 140 includes a first gating controller 141; and the interface unit 130 includes a serial port transceiver 131 and at least one first serial port connector 132, wherein the master controller 111 may adopt an Advanced RISC Machines (ARM) architecture controller, for example, may adopt a basic management controller as the master controller; and the microprocessor 121 may adopt a conventional single-chip microcomputer such as a 51 single-chip microcomputer, an STM32 single-chip microcomputer, etc.

The master controller 111 is connected to the microprocessor 121 via an SPI bus and/or an Inter-Integrated Circuit (I2C) bus. During implementation the master controller 111 and the microprocessor 121 may monitor each other's watchdog signals by means of their respective universal input/output pins, so as to achieve the monitoring of the operating state.

A UART pin of the master controller 111 and a UART pin of the microprocessor 121 are respectively connected to two gating ends of the first gating controller 141, a gating control end of the first gating controller 141 is connected to a first universal input/output pin CS1 of the microprocessor 121, a common input/output end of the first gating controller 141 is connected to one end of the serial port transceiver 131, and the other end of the serial port transceiver 131 is connected to the at least one first serial port connector 132 via a UART serial port bus.

It is to be noted that the common input/output end mentioned in some embodiments of the present application refers to a port that is commonly used by the two gating ends. When a data flow direction is from the master controller to an interface transceiver, the port serves as an output end relative to the master controller; and when the data flow direction is from the interface transceiver to the master controller, the port serves as an input end relative to the master controller. It is to be noted that common input/output ends of subsequent second gating controller and third gating controller are also applicable to explanations above.

In some embodiments of the present application, continuously referring to FIG. 2, the microprocessor 121 is configured to:

in response to an operating state of the master controller 111 being normal, select, via the first universal input/output pin CS1, a path from the UART pin of the master controller 111 to the common input/output end of the first gating controller 141 to become effective; and in response to the operating state of the master controller 111 being abnormal, select, via the first universal input/output pin CS1, a path from the UART pin of the microprocessor 121 to the common input/output end of the first gating controller 141 to become effective.

During implementation, the microprocessor 121 may monitor the operating state of the master controller 111 by means of monitoring a heartbeat signal, watchdog signal, etc. of the master controller 111. For example, a reference value of the monitored signal of the normal operating state may be pre-stored, then the monitored signal is periodically collected and compared with the reference values, and then whether the operating state of the master controller 111 is normal is determined according to a comparison result.

In the management board of some embodiments of the present application, management of a UART signal of the master controller 111 and a UART signal of the microprocessor 121 is implemented by means of the microprocessor 121, achieving redundancy for dual-path UART serial port signals. The master controller may be used, by default, to control the UART serial port signal, and when the master controller is abnormal, the microprocessor is used to take over an operation for managing the UART signal, thereby facilitating improvement of the stability and reliability of a UART serial port interface.

In some embodiments of the present application, continuously referring to FIG. 2, the first interface path and the second interface path both include CAN paths.

The first interface signal control unit 110 further includes a first SPI-to-CAN controller 112 and a second SPI-to-CAN controller 113, the gating unit 140 further includes a second gating controller 142 and a third gating controller 143, and the interface unit 130 further includes a first CAN transceiver 133, a second CAN transceiver 134, and a CAN port connector 135.

One SPI pin of the master controller 111 is connected to an SPI pin of the first SPI-to-CAN controller 112, and the other SPI pin of the master controller 111 is connected to an SPI pin of the second SPI-to-CAN controller 113.

A CAN pin of the first SPI-to-CAN controller 112 and a first CAN pin of the microprocessor 121 are respectively connected to two gating ends of the second gating controller 142, a gating control end of the second gating controller 142 is connected to a second universal input/output pin CS2 of the microprocessor 121, a common input/output end of the second gating controller 142 is connected to one end of the first CAN transceiver 133, and the other end of the first CAN transceiver 133 is connected to the CAN port connector 135.

A CAN pin of the second SPI-to-CAN controller 113 and a second CAN pin of the microprocessor 121 are respectively connected to two gating ends of the third gating controller 143, a gating control end of the third gating controller 143 is connected to a third universal input/output pin CS3 of the microprocessor 121, a common input/output end of the third gating controller 143 is connected to one end of the second CAN transceiver 134, and the other end of the second CAN transceiver 134 is connected to the CAN port connector 135.

In some embodiments of the present application, continuously referring to FIG. 2, the microprocessor 121 is configured to:

in response to an operating state of the master controller 111 being normal, select, via the second universal input/output pin CS2, a path from the CAN pin of the first SPI-to-CAN controller 112 to the common input/output end of the second gating controller 142 become effective, and select, via the third universal input/output pin CS3, a path from the CAN pin of the second SPI-to-CAN controller 113 to the common input/output end of the third gating controller 143 to become effective; and in response to the operating state of the master controller 111 being abnormal, select, via the second universal input/output pin CS2, a path from the first CAN pin of the microprocessor 121 to the common input/output end of the second gating controller 142 become effective, and select, via the third universal input/output pin CS3, a path from the second CAN pin of the microprocessor 121 to the common input/output end of the third gating controller 143 to become effective.

In the management board of some embodiments of the present application, management of an SPI signal of the master controller 111 and a CNA signal of the microprocessor 121 is implemented by means of the microprocessor 121, achieving redundancy for dual-path CAN interface signals. The master controller may be used, by default, to control conversion of the SPI signal to the CAN signal for output, and when the master controller is abnormal, the microprocessor is used to take over an operation for managing the CAN signal, thereby facilitating improvement of the stability and reliability of a CAN interface.

Figure 3:
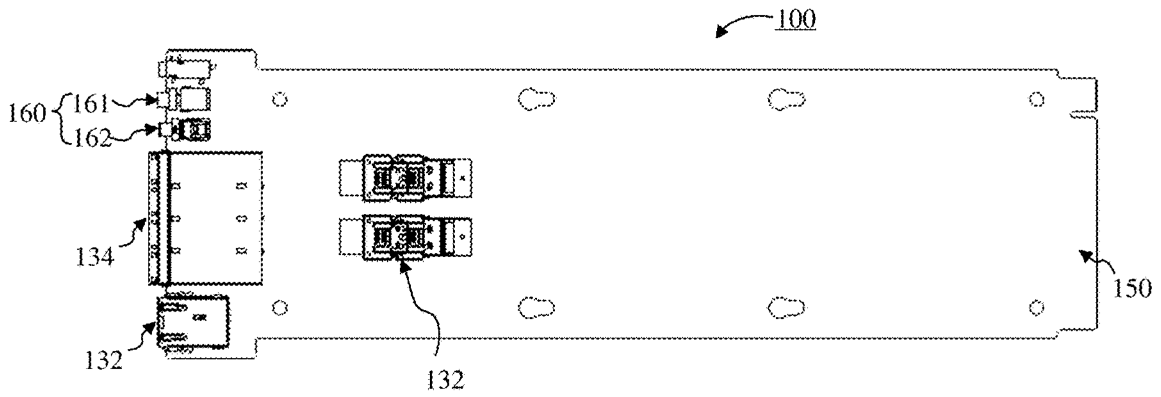
FIG. 3 is a top view of a management board according to the present application.

In some embodiments of the present application, referring to FIG. 3, the master controller 111 and the microprocessor 121 are both connected to a gold finger 150, and the gold finger 150 is detachably connected to a mainboard bus via a cable.

In the management board of some embodiments of the present application, the detachable connection between the management board and the mainboard is realized by means of the gold finger 150 and the cable, and the management board and the mainboard are no longer limited by distance, such that inspection and maintenance costs may be reduced, and the flexibility of interface management is improved.

Figure 5:
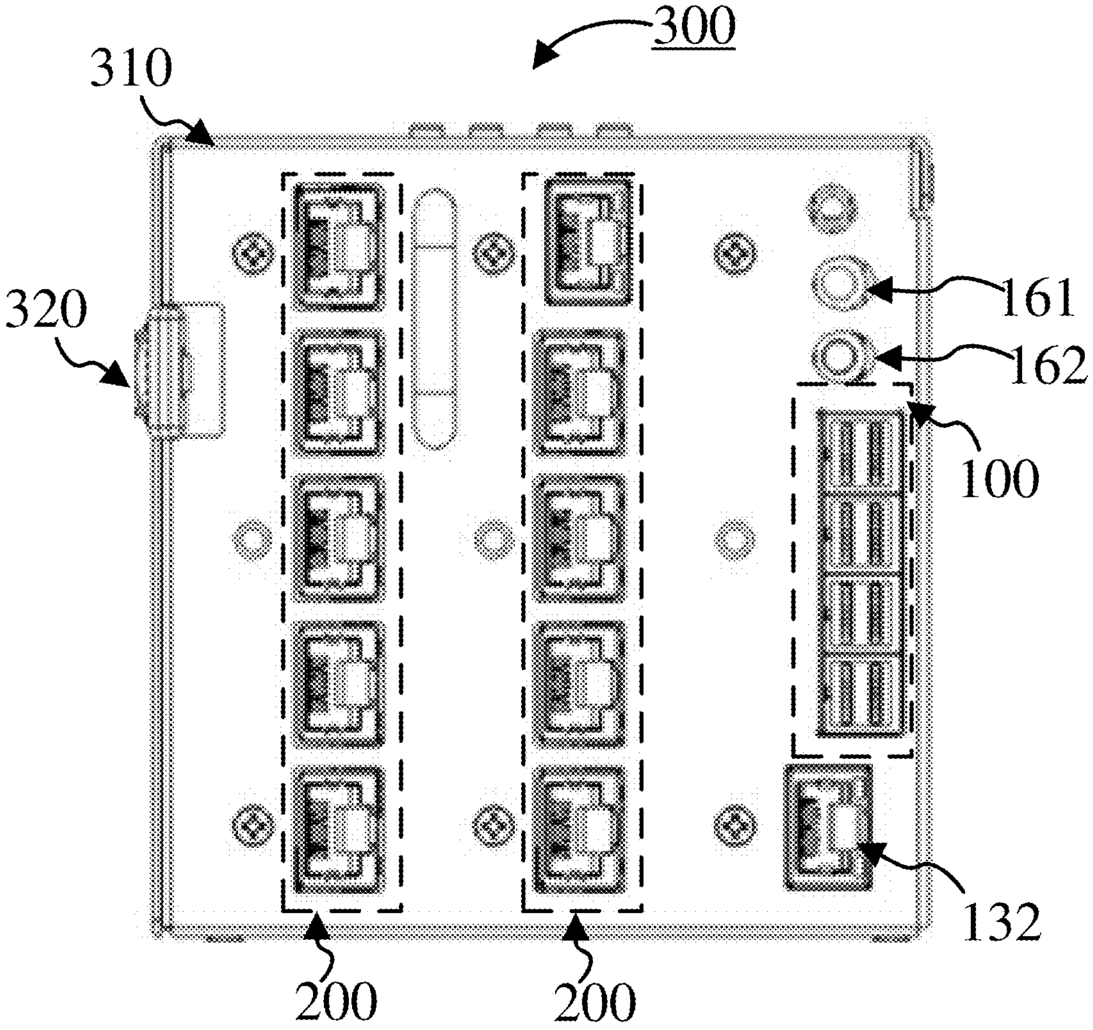
FIG. 5 is a schematic packaging diagram of an interface module according to the present application.

In some embodiments of the present application, referring to FIGS. 3 and 5, the management board 100 further includes an indication unit 160, wherein the indication unit 160 includes a first indicator lamp 161 and a second indicator lamp 162.

The first indicator lamp 161 is connected to the master controller 111, and configured to indicate an in-place state of the master controller 111.

The second indicator lamp 162 is connected to the microprocessor 121, and configured to indicate an in-place state of the microprocessor 121.

In the management board of some embodiments of the present application, the monitoring of the in-place states of the master controller 111 and the microprocessor 121 is realized by means of the first indicator lamp 161 and the second indicator lamp 162, such that a state of the management board is intuitively and conveniently fed back to a user, significantly reducing operation and maintenance difficulty, thereby facilitating improvement of the maintenance efficiency of the interface management board.

Figure 4:
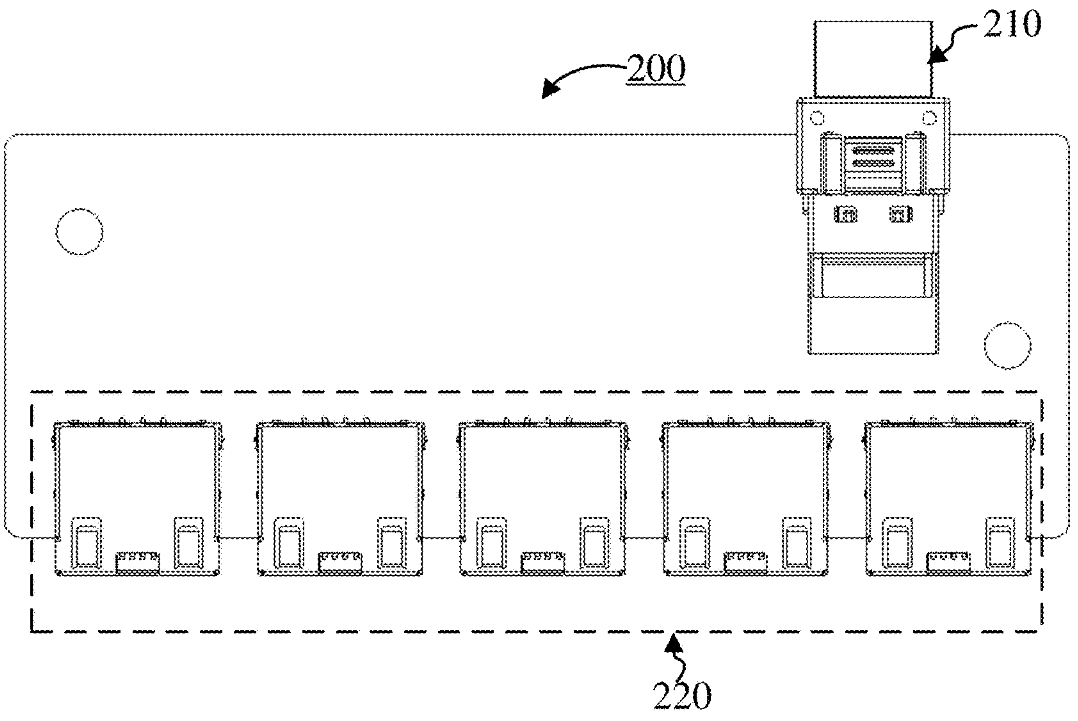
FIG. 4 is a top view of an expansion board according to the present application.

In some embodiments of the present application, referring to FIGS. 3, 4, and 5, the present application further provides an interface module 300. The interface module 300 includes the management board 100 of the embodiments above and an expansion board 200, wherein the expansion board 200 is connected to any interface on the management board 100 via an expansion board socket 210 and expands any interface into a plurality of identical interfaces; and the management board and the expansion board are packaged in a management box.

In some embodiments of the present application, a plurality of expansion boards may be disposed in the interface module. In an example of a serial port connector on the management board, the expansion board 200 is connected to any one of the first serial port connectors 132 via the expansion board socket 210, and expands any one of the first serial port connectors 132 into a plurality of second serial port connectors 220. The management board 100 and the expansion board 200 are packaged in the management box 310. The number of the first serial port connectors 132 is three, the number of the expansion boards 200 is two, and the two expansion boards 200 are respectively connected to the two first serial port connectors 132.

In some embodiments of the present application, referring to FIG. 5, assuming that one expansion board 200 may expand one UART serial port into five paths, whereby two expansion boards 200 may provide ten UART serial ports, and in combination with one unexpanded UART serial port reserved on the management board 100, the interface module 300 may provide up to eleven UART serial ports. During implementation, all UART serial ports of the management board 100 may be expanded. Therefore, the interface module 300 of some embodiments of the present application has excellent performance and scalability. It is to be noted that, dashed lines shown in FIG. 5 for indicating the management board 100 and the expansion board 200 do not actually exist. An area indicated by the dashed lines is only used for facilitating the understanding of a positional relationship between the management board 100 and the expansion board 200.

Figure 6:
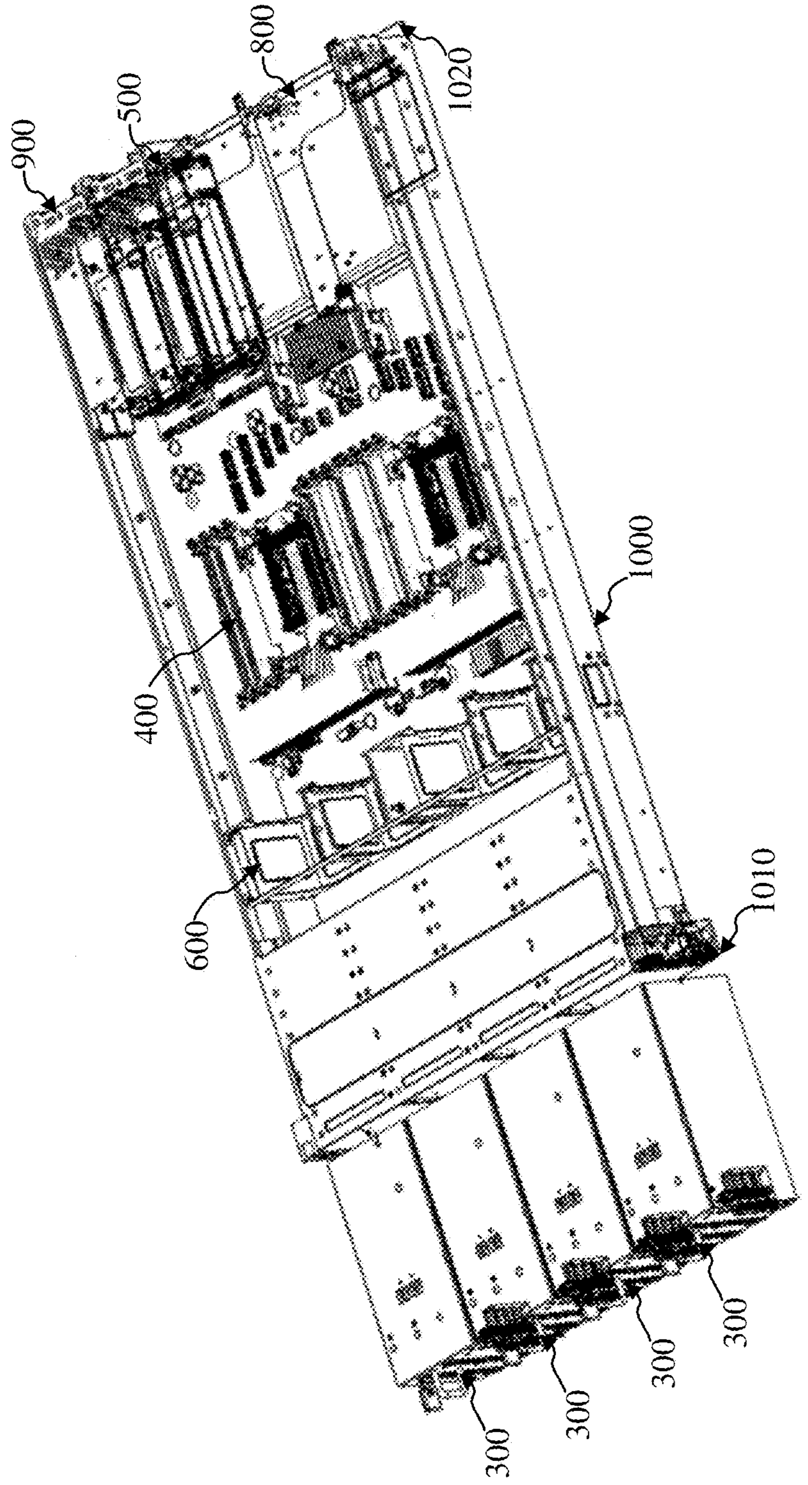
FIG. 6 is a schematic diagram of an entire structure of an industrial control server according to the present application.

FIG. 6 is a schematic diagram of an entire structure of an industrial control server according to the present application. Referring to FIG. 6, the present application further provides an industrial control server. The industrial control server includes:

a plurality of interface modules 300 of the embodiments above, wherein the interface modules 300 are all disposed at a front window 1010 of an industrial control server chassis 1000, and each interface module 300 includes at least one input/output interface that is configured to receive operating data from an industrial device.

In some embodiments of the present application, a plurality of interface modules 300 are independent of each other, and connection, detachment, and use between any two interface modules 300 do not affect each other. Any one of the interface modules 300 may include a plurality of input/output interfaces, and the input/output interface may be any existing interfaces that may achieve data transmission between an industrial device and a server, such as a high-speed bus interface, a serial data interface, etc. The number and type of interfaces included in different interface modules 300 may be the same or different.

A computing module 400 is detachably connected to each interface module 300 via a cable, and is configured to perform an operation on the operating data to generate a control instruction, and return the control instruction to the industrial device via a target input/output interface that receives the operating data.

In some embodiments of the present application, each of the interface modules 300 is connected to the computing module 400 via the cable, and a length of the cable is slightly greater than a distance between the interface module 300 and the computing module 400 when the entire interface module 300 is pulled out from the industrial control server chassis 1000. The detachable connection may be implemented by means of a matching socket, for example, two different types of sockets may be respectively provided at both ends of the cable, wherein one socket matches a slot in the computing module 400, and the other socket may be designed in the form of a slot to match the interface module 300. The forms of the sockets at both ends of the connecting cable may definitely be exchanged according to requirements. It is to be noted that each of the interface modules 300 supports hot swapping, such that inspection and replacement may be performed without shutting down the industrial control server during operation, for example, in response to the interface module being damaged.

A power supply module 500 is disposed at a rear window 1020 of the industrial control server chassis 1000, is detachably connected to the interface module 300 and the computing module 400, and is configured to supply power to the interface module 300 and the computing module 400, respectively.

In some embodiments of the present application, the power supply module 500 may be any existing power supply unit (PSU or power supply), as long as the power supply module 500 may convert a power supply into a voltage or a current required for operation of all modules in the industrial control server.

In the industrial control server of some embodiments of the present application, by means of arranging the plurality of interface modules 300, which are independent of each other, at the front window of the industrial control server chassis, the interface modules 300 may achieve data interaction between the industrial control server and the industrial device, and then perform an operation on data of the industrial device by utilizing the computing module 400 detachably connected to the interface modules, so as to obtain the control instruction. Meanwhile, by means of arranging the detachable power supply module 500 at the rear window of the industrial control server chassis, power is supplied for the computing module 400 and the interface module 300. The proposed modular design causes the industrial control server to have excellent maintainability and scalability, such that operation and maintenance costs may be reduced.

Figure 7:
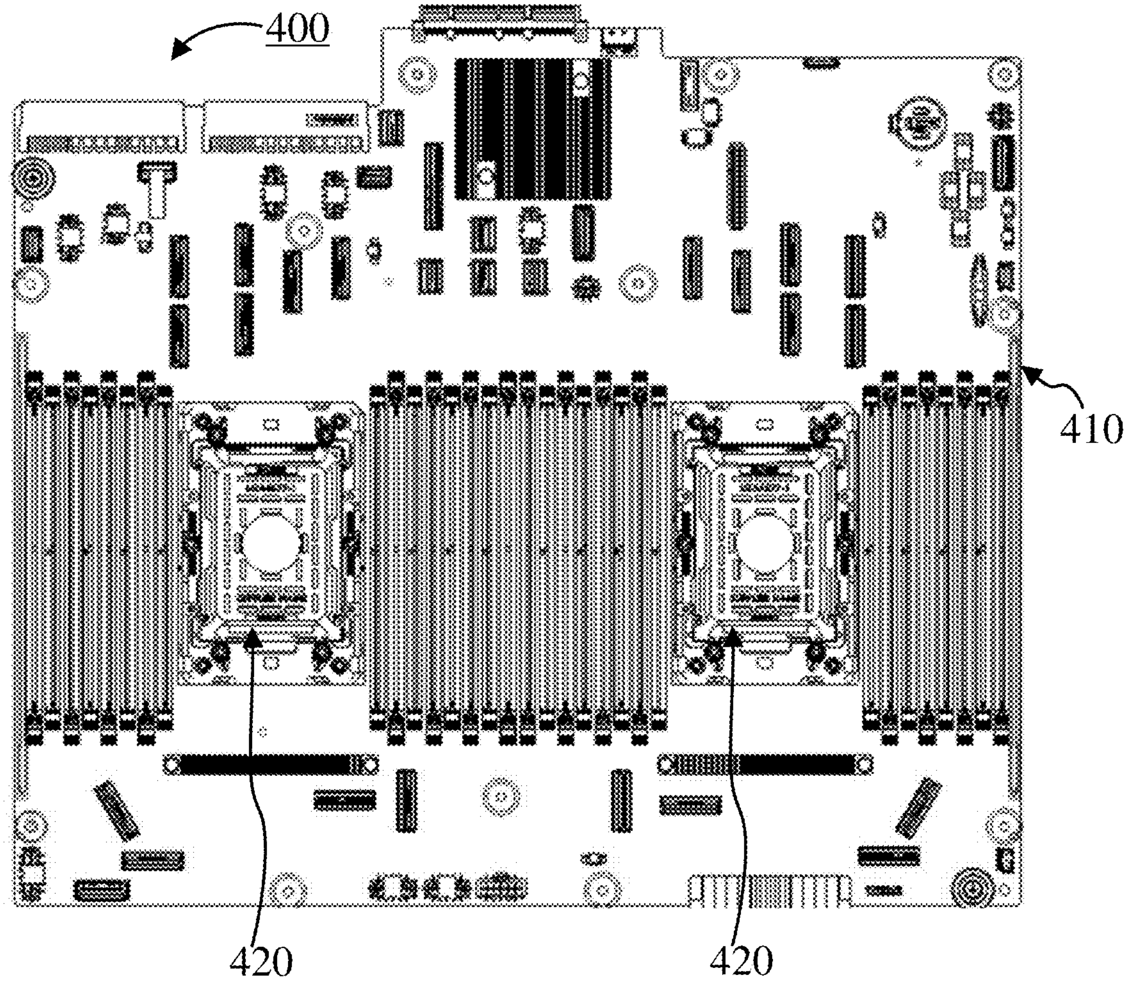
FIG. 7 is a schematic diagram of a computing module according to the present application.

In some embodiments of the present application, referring to FIG. 7, the computing module 400 includes: a mainboard 410 and two central processing units 420.

The two central processing units 420 are connected to the mainboard 410 via a single-dual path or a dual-single path, wherein the two central processing units 420 connected by adopting the single-dual path are interconnected via a high-speed bus to collaboratively execute a computing task; and the two central processing units 420 connected by adopting the dual-single path are able to simultaneously execute the computing task, and when either of the central processing units 420 fails, the other central processing unit 420 takes over the computing task of the central processing unit 420 that fails.

In the industrial control server of some embodiments of the present application, two Central Processing Unit (CPUs) are designed in the computing module 400. The two CPUs are distributed on the same mainboard, and design of a single-dual path and a dual-single path may be realized. The single-dual path is that the two CPUs are on one mainboard, the CPUs are interconnected with each other via a high-speed bus, the CPUs collaborate with each other, and the master CPU is CPU0. The dual-single path is that the two CPUs are distributed on one mainboard, but the two CPUs are in a redundant backup relationship, each CPU operates independently, and when the master CPU fails, the slave CPU may take over the operation of the master CPU and process data, so as to ensure stable and reliable control. Moreover, the system supports a firmware verification function. Whether firmware of the current system is changed may be verified by a security management module. Repair processing is performed in response to an abnormality. The microcontroller firmware on the management board also performs monitoring management in real time.

Figure 8:
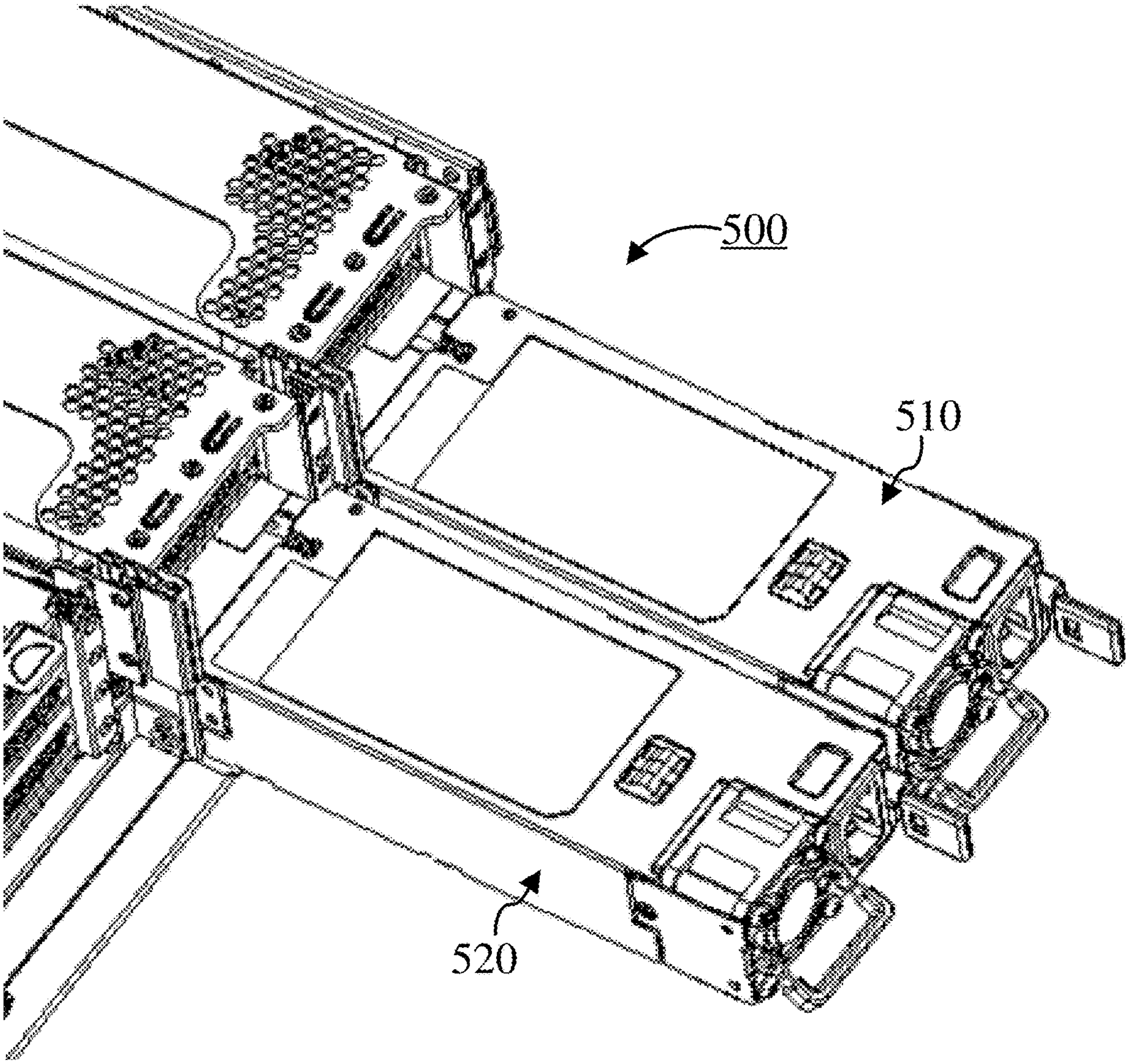
FIG. 8 is a schematic diagram of a power supply module according to the present application.

In some embodiments of the present application, referring to FIG. 8, the power supply module 500 includes a first PSU 510 and a second PSU 520. The power supply module 500 is configured to:

control, in response to both the first PSU 510 and the second PSU 520 being normal, the first PSU 510 and the second PSU 520 to respectively bear half of a load;

control, in response to the first PSU 510 being normal and the second PSU 520 being abnormal, the first PSU 510 to bear the entire load; and control, in response to the first PSU 510 being abnormal and the second PSU 520 being normal, the second PSU 520 to bear the entire load.

In the industrial control server of some embodiments of the present application, a power supply portion uses two PSUs for power supply, and the PSUs use a 1+1 redundant backup manner. When one PSU fails, the other PSU may continue to output power normally, so as to ensure power supply requirements of the system. Meanwhile, the PSUs support hot swapping design, such that, during maintenance of a faulty PSU, replacement may be directly performed in a plug-and-play manner, thereby meeting rapid and convenient maintenance requirements.

Figure 9:
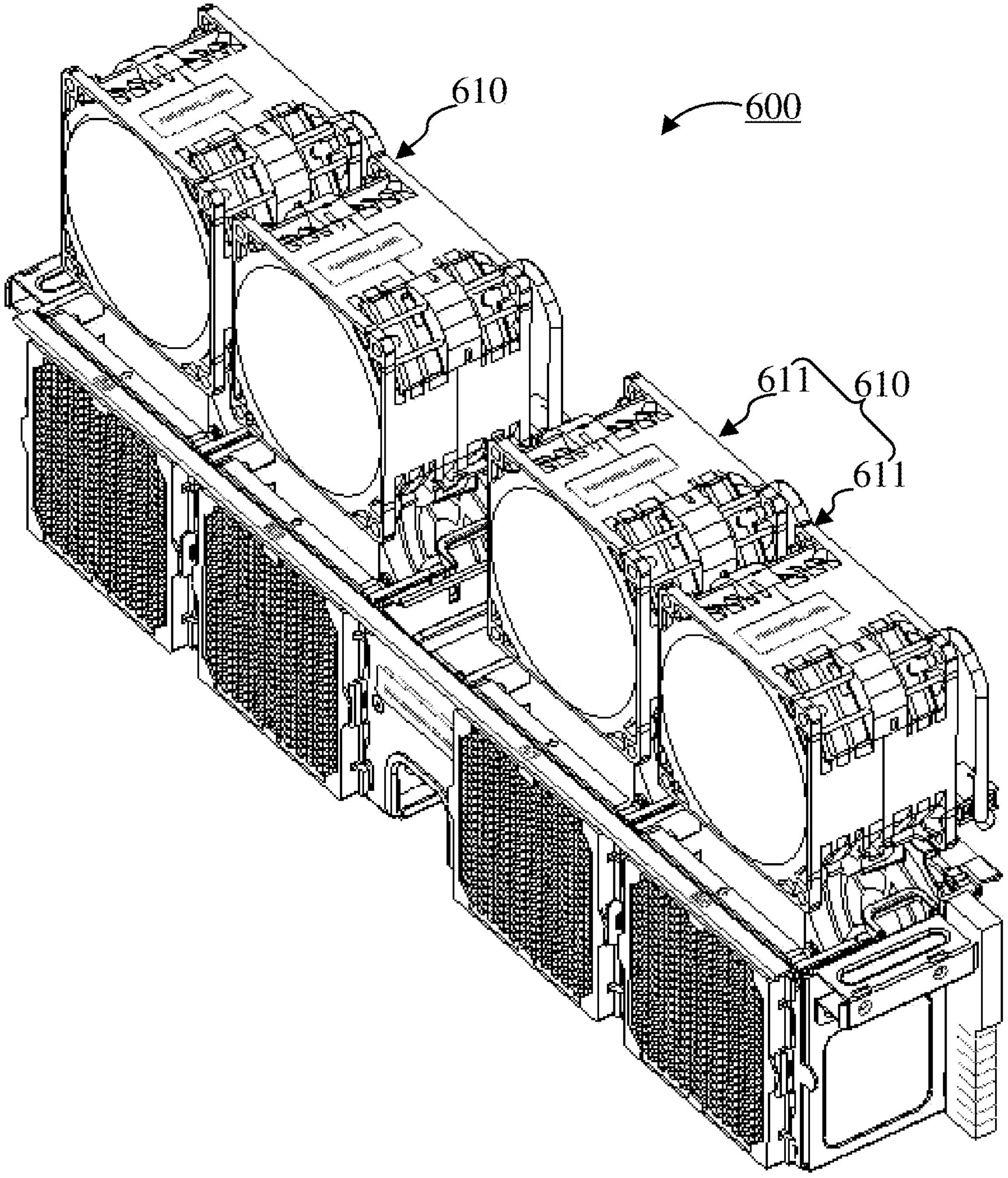
FIG. 9 is a schematic diagram of an air-cooled heat dissipation module according to the present application.

In some embodiments of the present application, referring to FIGS. 6 and 9, the industrial control server further includes an air-cooled heat dissipation module 600.

The air-cooled heat dissipation module 600 is disposed between the interface module 300 and the computing module 400; the air-cooled heat dissipation module 600 is detachably connected to the computing module 400, and configured to deliver an air volume according to an operating state of the computing module 400; and the air-cooled heat dissipation module 600 is turned on immediately after the computing module 400 is powered on.

In some embodiments of the present application, further referring to FIG. 9, the air-cooled heat dissipation module 600 includes at least one fan module 610, each fan module 610 includes two fans 611, and the two fans 611 belonging to the same fan module 610 are mutually redundant.

For example, the fan may use four 8056 fans 611. The fan module 610 is of a dual-rotor design structure. Each module internally has two fan 611 motors that may operate at the same time, such that strong wind pressure and wind speed may be provided. The fan supports a single-fan redundancy design. When one fan module 610 fails, other fans may still meet heat dissipation requirements, and may support, when a fan fails, a plugging and unplugging operation to replace the fan module 610.

In the industrial control server of some embodiments of the present application, temperature cooling for the industrial control server is realized by means of the air-cooled heat dissipation module, thereby ensuring the operational environment security of the server, and in combination with the redundant design of the fans, the security and stability of the industrial control server are improved.

Figure 10:
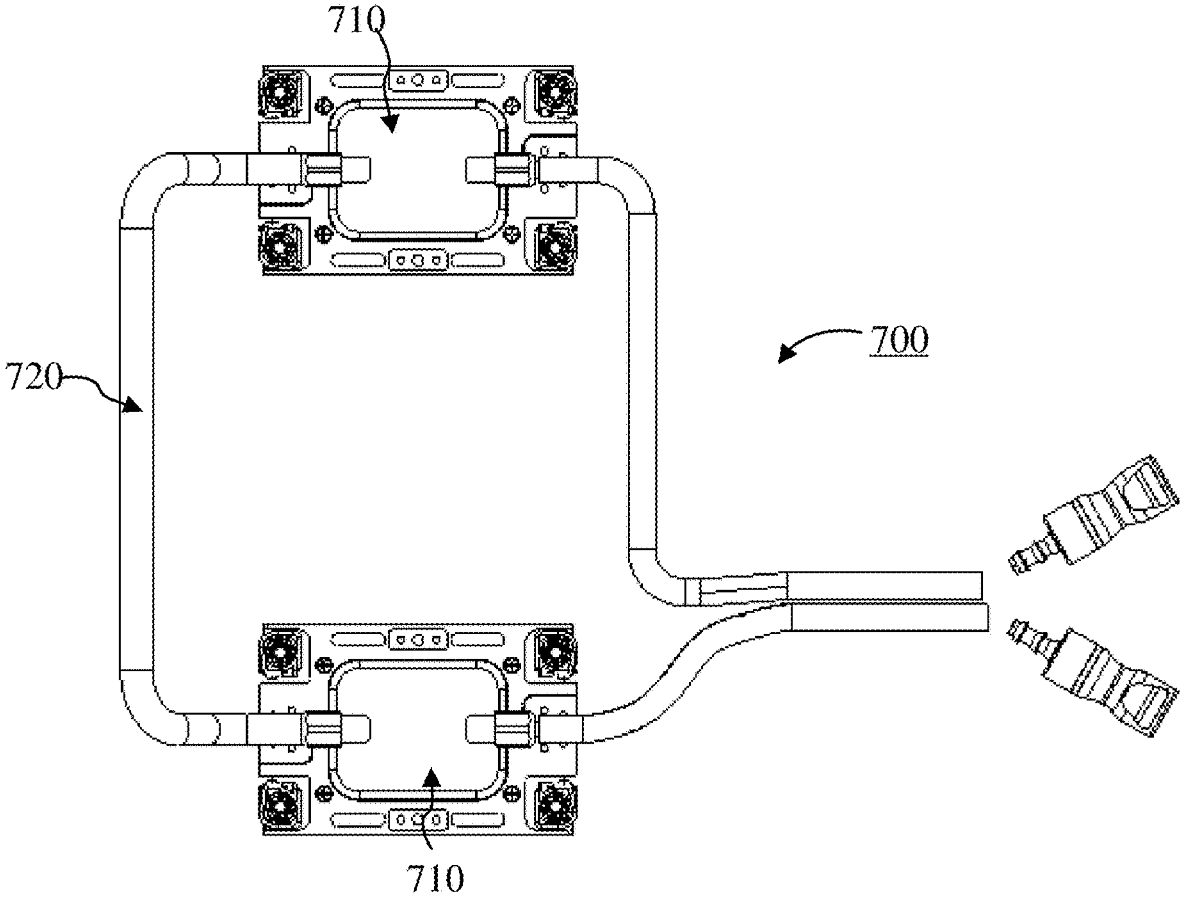
FIG. 10 is a schematic diagram of a cold-plate heat dissipation module according to the present application.

In some embodiments of the present application, referring to FIG. 10, the industrial control server further includes a cold-plate heat dissipation module 700.

The cold-plate heat dissipation module 700 includes two cold plates 710 and a liquid cooling pipeline 720, and the two cold plates 710 are respectively attached to two central processing units 420 and connected in series via the liquid cooling pipeline 720.

In some embodiments of the present application, the cold-plate heat dissipation module 700 is configured to turn on in response to a temperature of any central processing unit 420 exceeding a preset value.

In the industrial control server of some embodiments of the present application, in order to provide higher heat dissipation adaptability and respond to more complex environments, the cold-plate heat dissipation module 700 is added for heat dissipation of the central processing unit (CPU) of the computing module. The cold plate 710 and the liquid cooling pipeline 720 are connected in series, pipelines of the two CPUs are connected in series, and high-temperature liquid is ultimately transported out to the rear window of the server via the unified pipeline, thereby improving the security and stability of the industrial control server. Furthermore, since the cold-plate heat dissipation module uses a circulating cooling manner, noise and energy consumption may be effectively reduced.

Figure 11:
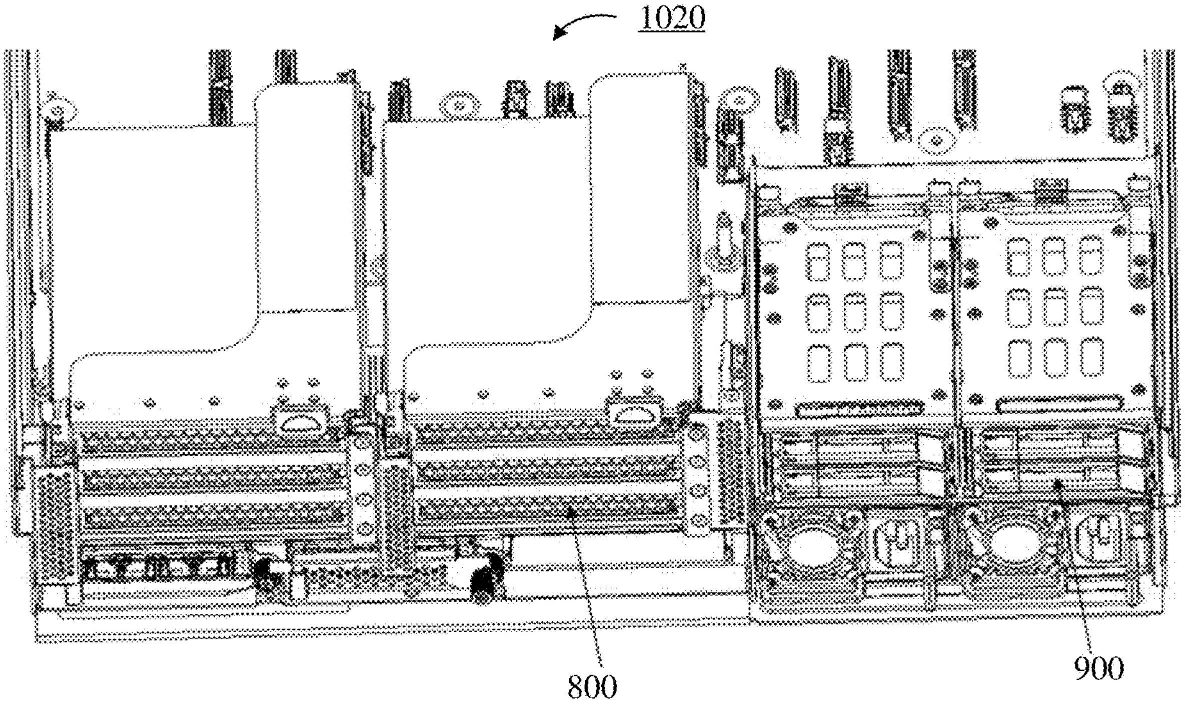
FIG. 11 is a schematic diagram of a rear window of an industrial control server chassis according to the present application.

In some embodiments of the present application, referring to FIG. 11, the industrial control server further includes a network module 800.

The network module 800 is disposed at the rear window 1020 of the industrial control server chassis 1000, and includes two dual-port network cards, wherein the two dual-port network cards are respectively connected to two central processing units 420, and two network ports of each dual-port network card are mutually redundant.

In the industrial control server of some embodiments of the present application, a network is partially distributed at a rearmost end of the server. The network is supported via a standard network card, the network card is connected to a board card of the server via the gold finger, and the server mainboard is connected to the board card via a cable, so as to meet requirements of the board card for high-speed signals, power supply, and low-speed signal transmission. Each CPU may be individually connected to a dual-port network card, the two network ports of the network card achieve redundancy, and at the same time, network cards under two different links synchronously achieve redundancy. Moreover, network resources may perform flexible addition, reduction, or replacement of the modules according to user needs, thereby enhancing the flexibility of the industrial control server.

In some embodiments of the present application, the industrial control server further includes a storage module 900.

The storage module 900 is disposed at the rear window 1020 of the industrial control server chassis 1000, and includes a hard disk backplane and at least one hard disk, wherein each hard disk is connected to the hard disk backplane via a gold finger, and the hard disk backplane is connected to the mainboard 410 via a cable.

In the industrial control server of some embodiments of the present application, a storage portion is disposed at the rear window of the server, and is connected to the hard disk via the hard disk backplane. The hard disk backplane is connected to the mainboard via a cable. The hard disk may support hot swapping to meet online hot operation and maintenance, Moreover, storage resources may also perform flexible addition, reduction, or replacement of the modules according to the user needs, thereby enhancing the flexibility.

In some embodiments of the present application, the interface module 300 supports hot swapping.

In the industrial control server of some embodiments of the present application, by means of designing the interface module 300 a structure that supports hot swapping, the replacement and maintenance of the interface module are greatly facilitated during operation of the industrial control server, thereby significantly reducing operation and maintenance costs.

In some embodiments of the present application, further referring to FIGS. 5 and 6, a snap-fit 320 is provided on a side wall of a management box 310 corresponding to each interface module 300, and a snap groove (not shown in the figure) matching the snap-fit 320 is provided in a side wall of the front window 1010 of the industrial control server chassis 1000.

During implementation, when there are a plurality of interface modules 300, a plurality of partition plates may be disposed at the front window of the industrial control server, the partition plates and the side wall of the front window of the server chassis may provide mounting spaces for each interface module, and tool-free disassembly and assembly of the interface module 300 may be realized by pushing and pulling the snap-fit 320.

The industrial control system provided in the present application is described below, and the industrial control system described below and the industrial control server described above may be correspondingly referenced to each other.

In some embodiments, the present application further provides an industrial control system. The industrial control system includes an industrial device and the industrial control server of the embodiments above, wherein the industrial device is connected to the industrial control server via a cable; and the industrial device receives a control instruction via the industrial control server.

The industrial control server includes: a plurality of interface modules independent of each other, wherein each interface module is disposed at a front window of an industrial control server chassis, and each interface module includes at least one input/output interface that is configured to receive operating data from the industrial device; a computing module, wherein the computing module is detachably connected to each interface module via a cable and configured to perform an operation on the operating data to generate a control instruction, and return the control instruction to the industrial device via a target input/output interface that receives the operating data; and a power supply module, wherein the power supply module is disposed at a rear window of the industrial control server chassis, is detachably connected to the interface module and the computing module, and is configured to supply power to the interface module and the computing module, respectively.

In the industrial control system of some embodiments of the present application, by means of arranging the plurality of interface modules, which are independent of each other, at the front window of the industrial control server chassis, the interface modules may achieve data interaction between the industrial control server and the industrial device, and then perform an operation on data of the industrial device by utilizing the computing module detachably connected to the interface modules, so as to obtain the control instruction. Meanwhile, by means of arranging the detachable power supply module at the rear window of the industrial control server chassis, power is supplied for the computing module and the interface module. The proposed modular design causes the industrial control server to have excellent maintainability and scalability, such that operation and maintenance costs may be reduced.

Finally, it should be noted that the foregoing embodiments are merely used to illustrate the technical solutions of the present application, but are not intended to limit the same. Although the present application is described in detail with reference to the foregoing embodiments, those of ordinary skill in the art should understand that they may still modify the technical solutions described in the foregoing embodiments, or make equivalent replacements on some technical features therein. These modifications or replacements do not make the essence of the corresponding technical solutions deviate from the spirit and scope of the technical solutions of the embodiments of the present application.

The invention claimed is:

1. A management board, comprising:

a first interface signal control unit, wherein the first interface signal control unit is connected to a mainboard via a bus;

a second interface signal control unit, wherein the second interface signal control unit is connected to the mainboard via the bus, and the second interface signal control unit is connected to the first interface signal control unit to acquire an operating state of the first interface signal control unit;

an interface unit, wherein the interface unit is provided with at least one interface; and a gating unit, wherein one gating end of the gating unit is connected to the first interface signal control unit and the interface unit to form a first interface path, the other gating end of the gating unit is connected to the second interface signal control unit and the interface unit to form a second interface path, and a gating control end of the gating unit is connected to the second interface signal control unit, wherein the second interface signal control unit is configured to select the first interface path or the second interface path according to the operating state;

wherein the first interface path and the second interface path both comprise universal asynchronous receiver/transmitter (UART) serial port paths;

the first interface signal control unit comprises a master chip, the second interface signal control unit comprises a microprocessor, the gating unit comprises a first gating chip, and the interface unit comprises a serial port transceiver and at least one first serial port connector;

the master chip is connected to the microprocessor via a serial peripheral interface (SPI) bus and/or an inter-integrated circuit (I2C) bus; and a UART pin of the master chip and a UART pin of the microprocessor are respectively connected to two gating ends of the first gating chip, a gating control end of the first gating chip is connected to a first universal input/output pin of the microprocessor, a common input/output end of the first gating chip is connected to one end of the serial port transceiver, and the other end of the serial port transceiver is connected to the at least one first serial port connector via a UART serial port bus.

2. The management board as claimed in claim 1, wherein the microprocessor is configured to:

in response to an operating state of the master chip being normal, select, via the first universal input/output pin, a path from the UART pin of the master chip to the common input/output end of the first gating chip to become effective; and in response to the operating state of the master chip being abnormal, select, via the first universal input/output pin, a path from the UART pin of the microprocessor to the common input/output end of the first gating chip to become effective.

3. The management board as claimed in claim 1, wherein the first interface path and the second interface path both comprise Controller Area Network (CAN) paths;

the first interface signal control unit further comprises a first SPI-to-CAN chip and a second SPI-to-CAN chip, the gating unit further comprises a second gating chip and a third gating chip, and the interface unit further comprises a first CAN transceiver, a second CAN transceiver, and a CAN port connector;

one SPI pin of the master chip is connected to an SPI pin of the first SPI-to-CAN chip, and the other SPI pin of the master chip is connected to an SPI pin of the second SPI-to-CAN chip;

a CAN pin of the first SPI-to-CAN chip and a first CAN pin of the microprocessor are respectively connected to two gating ends of the second gating chip, a gating control end of the second gating chip is connected to a second universal input/output pin of the microprocessor, a common input/output end of the second gating chip is connected to one end of the first CAN transceiver, and the other end of the first CAN transceiver is connected to the CAN port connector; and a CAN pin of the second SPI-to-CAN chip and a second CAN pin of the microprocessor are respectively connected to two gating ends of the third gating chip, a gating control end of the third gating chip is connected to a third universal input/output pin of the microprocessor, a common input/output end of the third gating chip is connected to one end of the second CAN transceiver, and the other end of the second CAN transceiver is connected to the CAN port connector.

4. The management board as claimed in claim 3, wherein the microprocessor is configured to:

in response to an operating state of the master chip being normal, select, via the second universal input/output pin, a path from the CAN pin of the first SPI-to-CAN chip to the common input/output end of the second gating chip become effective, and select, via the third universal input/output pin, a path from the CAN pin of the second SPI-to-CAN chip to the common input/output end of the third gating chip to become effective; and in response to the operating state of the master chip being abnormal, select, via the second universal input/output pin, a path from the first CAN pin of the microprocessor to the common input/output end of the second gating chip become effective, and select, via the third universal input/output pin, a path from the second CAN pin of the microprocessor to the common input/output end of the third gating chip to become effective.

5. The management board as claimed in claim 1, wherein the master chip and the microprocessor are both connected to a gold finger, and the gold finger is detachably connected to a mainboard bus via a cable.

6. The management board as claimed in claim 1, further comprising an indication unit, wherein the indication unit comprises a first indicator lamp and a second indicator lamp;

the first indicator lamp is connected to the master chip, and configured to indicate an in-place state of the master chip; and the second indicator lamp is connected to the microprocessor, and configured to indicate an in-place state of the microprocessor.

7. The management board as claimed in claim 1, wherein the second interface signal control unit is configured to control the gating unit, when the operating state of the first interface signal control unit is normal, to select the first interface path, or control the gating unit, when the operating state of the first interface signal control unit is abnormal, to select the second interface path.

8. An interface module, comprising an expansion board and a management board, wherein the expansion board is connected to any interface on the management board via an expansion board socket and expands any interface into a plurality of identical interfaces, and the management board and the expansion board are packaged in a management box; the management board comprises:

a first interface signal control unit, wherein the first interface signal control unit is connected to a mainboard via a bus;

a second interface signal control unit, wherein the second interface signal control unit is connected to the mainboard via the bus, and the second interface signal control unit is connected to the first interface signal control unit to acquire an operating state of the first interface signal control unit;

an interface unit, wherein the interface unit is provided with at least one interface; and a gating unit, wherein one gating end of the gating unit is connected to the first interface signal control unit and the interface unit to form a first interface path, the other gating end of the gating unit is connected to the second interface signal control unit and the interface unit to form a second interface path, and a gating control end of the gating unit is connected to the second interface signal control unit, wherein the second interface signal control unit is configured to select the first interface path or the second interface path according to the operating state;

wherein the first interface path and the second interface path both comprise universal asynchronous receiver/transmitter (UART) serial port paths;

the first interface signal control unit comprises a master chip, the second interface signal control unit comprises a microprocessor, the gating unit comprises a first gating chip, and the interface unit comprises a serial port transceiver and at least one first serial port connector;

the master chip is connected to the microprocessor via a serial peripheral interface (SPI) bus and/or an inter-integrated circuit (I2C) bus; and a UART pin of the master chip and a UART pin of the microprocessor are respectively connected to two gating ends of the first gating chip, a gating control end of the first gating chip is connected to a first universal input/output pin of the microprocessor, a common input/output end of the first gating chip is connected to one end of the serial port transceiver, and the other end of the serial port transceiver is connected to the at least one first serial port connector via a UART serial port bus.

9. The interface module as claimed in claim 8, wherein a plurality of expansion boards are provided.

10. An industrial control server, comprising:

a plurality of interface modules, wherein the interface modules are all disposed at a front window of an industrial control server chassis, and each interface module comprises at least one input/output interface that is configured to receive operating data from an industrial device;

a computing module, wherein the computing module is detachably connected to each interface module via a cable, and is configured to perform an operation on the operating data to generate a control instruction, and return the control instruction to the industrial device via a target input/output interface that receives the operating data; and a power supply module, wherein the power supply module is disposed at a rear window of the industrial control server chassis, is detachably connected to the interface module and the computing module, and is configured to supply power to the interface module and the computing module, respectively;

each interface module comprises: an expansion board and a management board, wherein the expansion board is connected to any interface on the management board via an expansion board socket and expands any interface into a plurality of identical interfaces, and the management board and the expansion board are packaged in a management box;

the management board comprises:

a first interface signal control unit, wherein the first interface signal control unit is connected to a mainboard via a bus;

a second interface signal control unit, wherein the second interface signal control unit is connected to the mainboard via the bus, and the second interface signal control unit is connected to the first interface signal control unit to acquire an operating state of the first interface signal control unit;

an interface unit, wherein the interface unit is provided with at least one interface; and a gating unit, wherein one gating end of the gating unit is connected to the first interface signal control unit and the interface unit to form a first interface path, the other gating end of the gating unit is connected to the second interface signal control unit and the interface unit to form a second interface path, and a gating control end of the gating unit is connected to the second interface signal control unit, wherein the second interface signal control unit is configured to select the first interface path or the second interface path according to the operating state;

wherein the first interface path and the second interface path both comprise universal asynchronous receiver/transmitter (UART) serial port paths;

the first interface signal control unit comprises a master chip, the second interface signal control unit comprises a microprocessor, the gating unit comprises a first gating chip, and the interface unit comprises a serial port transceiver and at least one first serial port connector;

the master chip is connected to the microprocessor via a serial peripheral interface (SPI) bus and/or an inter-integrated circuit (I2C) bus; and a UART pin of the master chip and a UART pin of the microprocessor are respectively connected to two gating ends of the first gating chip, a gating control end of the first gating chip is connected to a first universal input/output pin of the microprocessor, a common input/output end of the first gating chip is connected to one end of the serial port transceiver, and the other end of the serial port transceiver is connected to the at least one first serial port connector via a UART serial port bus.

11. The industrial control server as claimed in claim 10, wherein the computing module comprises: a mainboard and two central processing units;

the two central processing units are connected to the mainboard via a single-dual path or a dual-single path, wherein the two central processing units connected by adopting the single-dual path are interconnected via a high-speed bus to collaboratively execute a computing task; and the two central processing units connected by adopting the dual-single path are able to simultaneously execute the computing task, and when either of the central processing units fails, the other central processing unit takes over the computing task of the central processing unit that fails.

12. The industrial control server as claimed in claim 11, further comprising a cold-plate heat dissipation module, wherein the cold-plate heat dissipation module comprises two cold plates and a liquid cooling pipeline, and the two cold plates are respectively attached to two central processing units and connected in series via the liquid cooling pipeline.

13. The industrial control server as claimed in claim 12, wherein the cold-plate heat dissipation module is configured to turn on in response to a temperature of any central processing unit exceeding a preset value.

14. The industrial control server as claimed in claim 11, further comprising a network module, wherein the network module is disposed at a rear window of an industrial control server chassis, and comprises two dual-port network cards, wherein the two dual-port network cards are respectively connected to two central processing units, and two network ports of each dual-port network card are mutually redundant.

15. The industrial control server as claimed in claim 11, further comprising a storage module, wherein the storage module is disposed at a rear window of an industrial control server chassis, and comprises a hard disk backplane and at least one hard disk, wherein each hard disk is connected to the hard disk backplane via a gold finger, and the hard disk backplane is connected to the mainboard via a cable.

16. The industrial control server as claimed in claim 10, wherein the power supply module comprises a first power supply unit (PSU) and a second PSU; and the power supply module is configured to:

control, in response to both the first PSU and the second PSU being normal, the first PSU and the second PSU to respectively bear half of a load;

control, in response to the first PSU being normal and the second PSU being abnormal, the first PSU to bear the entire load; and control, in response to the first PSU being abnormal and the second PSU being normal, the second PSU to bear the entire load.

17. The industrial control server as claimed in claim 10, wherein further comprising an air-cooled heat dissipation module, wherein the air-cooled heat dissipation module is disposed between the interface module and the computing module; the air-cooled heat dissipation module is detachably connected to the computing module, and configured to deliver an air volume according to an operating state of the computing module; and the air-cooled heat dissipation module is turned on immediately after the computing module is powered on.

18. The industrial control server as claimed in claim 17, wherein the air-cooled heat dissipation module comprises at least one fan module, each fan module comprises two fans, and the two fans belonging to a same fan module are mutually redundant.

19. The industrial control server as claimed in claim 10, wherein the interface module supports hot swapping.

20. The industrial control server as claimed in claim 10, wherein a snap-fit is provided on a side wall of a management box corresponding to each interface module, and a snap groove matching the snap-fit is provided in a side wall of the front window of the industrial control server chassis.

* * * * *